United States Patent
Osentoski

(10) Patent No.: US 6,742,388 B1
(45) Date of Patent: Jun. 1, 2004

(54) DEVICE FOR MEASURING THE ANGULAR VELOCITY OF A PIVOTALLY MOUNTED VEHICLE ELEMENT

(75) Inventor: Larry Osentoski, Clarkston, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 10/306,209

(22) Filed: Nov. 26, 2002

(51) Int. Cl.[7] .............................. G01P 9/00; G01C 19/58
(52) U.S. Cl. ..................... 73/503.3; 73/488; 73/504.02; 73/504.08
(58) Field of Search .......................... 73/488, 489, 491, 73/492, 503, 503.3, 504.01, 504.02, 504.03, 504.08, 504.18, 506, 514.02, 514.26, 865.3, 486

(56) References Cited

U.S. PATENT DOCUMENTS

| | | | | |
|---|---|---|---|---|
| 4,674,230 A | * | 6/1987 | Takeo et al. .................... 49/32 |
| 4,959,598 A | * | 9/1990 | Yoshida et al. ............. 318/599 |
| 5,418,442 A | * | 5/1995 | Araki ........................ 318/651 |
| 5,456,109 A | * | 10/1995 | Lautzenhiser et al. ... 73/514.03 |
| 5,468,042 A | * | 11/1995 | Heinrichs et al. ........ 296/146.4 |
| 5,493,909 A | * | 2/1996 | Araki ...................... 73/504.08 |
| 5,653,056 A | * | 8/1997 | Stark .............................. 49/43 |
| 5,936,167 A | * | 8/1999 | Kulig et al. ............... 73/865.6 |
| 5,950,952 A | * | 9/1999 | Koketsu .................. 242/384.4 |
| 6,062,079 A | * | 5/2000 | Stewart ........................ 73/488 |
| 6,494,850 B1 | * | 12/2002 | Kitadou et al. ............... 601/49 |
| 6,516,665 B1 | * | 2/2003 | Varadan et al. .......... 73/504.01 |
| 6,568,634 B2 | * | 5/2003 | Smith ........................... 244/72 |

OTHER PUBLICATIONS

Systems & Electronics, Inc., "Structural Data Recording Set (SDRS)", Available on the Internet at <http://www.sysei.com>.*

EnduraTEC, "Fatigue Testing of Thin Metallic Foils and Wires", Available on the Internet at <http://www.enduratec.com>.*

Greene, J. A. et al., "Damage Analysis During Full-Scale Testing of F–15 Airframe UsingArrays of Optical Fiber Sensors", 1994, The Society of Photo-Optical Instrumentation Engineers, Proceedings of the SPIE, vol. 2191, pp. 494–498.*

SEMCOR, "SCANSDRS/SANFEMS", Available on the Internet at <http://domino2.semcor.com>.*

Burreson, B., "A Magnetic Linear Position Transducer for Fail-Safe Target Tracking", Nov. 2002, Available on the Internet at <http://www.sensormag.com>.*

Selvarajan, A. et al. "Photonics, Fiber Optic Sensors, and their Application in Smart Structures", Jun. 1995, Journal of Non-Destructive Evaluation, vol. 15, No. 2, pp. 41–56.*

M. Casco Associates, "Vibration Monitoring Questions", Aug. 6, 1999, Available on the Internet at <http://mcasco.com/qa_vmq.html>.*

Hall, S. R. et al., "The Total Data Integrity Initiative—Structural Health Monitoring, The Next Generation", Mar. 1999, Available on the Internet at <www.celeris.ca/cac_usaf_asip99_03.pdf>.*

* cited by examiner

Primary Examiner—Hezron Williams
Assistant Examiner—David A. Rogers
(74) Attorney, Agent, or Firm—Edwin W. Bacon, Jr.

(57) ABSTRACT

A vehicle is provided, including a vehicle body; at least one vehicle element pivotally mounted to the vehicle, the vehicle element configured to pivot through an angle not more than 360 degrees; and a measuring arrangement configured to measure an angular velocity of the at least one vehicle element.

8 Claims, 3 Drawing Sheets

DEVICE FOR MEASURING THE ANGULAR VELOCITY OF A PIVOTALLY MOUNTED VEHICLE ELEMENT

FIELD OF THE INVENTION

The present invention is related to a vehicle including a measuring device configured to measure the angular velocity of at least one pivotally mounted vehicle element.

BACKGROUND INFORMATION

It is believed that, in various operational situations, it may be advantageous to measure the angular velocity of at least one pivotally mounted vehicle element configured to be manually pivoted by a user not more than 360 degrees. Such pivotally mounted vehicle elements may include, for example, car doors, minivan lift gates, trunks, hoods, seats, tilt wheels, glove compartments, center bins, etc. The measured angular velocity information may then be, for example, stored on a storage unit situated within the vehicle, and later retrieved, for example, by a design engineer, who may use the information to obtain vital "use statistics" related to the automobile. These use statistics may include, for example, a number of times the mounted vehicle element is opened and/or closed, a peak angular velocity of the mounted vehicle element, an angular acceleration of the mounted vehicle element, etc. In this manner, the use statistics may help the design engineer better design various pivotally mounted vehicle elements.

SUMMARY OF THE INVENTION

It is an object of the present invention to provide a vehicle, including a vehicle body; at least one vehicle element pivotally mounted to the vehicle body, the vehicle element configured to pivot through an angle not more than 360 degrees; and a measuring arrangement configured to measure an angular velocity of the at least one vehicle element.

It is another object of the present invention to provide the vehicle described above, in which the at least one vehicle element includes at least one of a vehicle door, a lift-gate, a trunk, a hood, a seat-back, a tilt-wheel, and a glove compartment.

It is still another object of the present invention to provide the vehicle described above, in which the measuring arrangement is configured to measure the angular velocity during at least one of an opening and a closing of the at least one vehicle element.

It is yet another object of the present invention to provide the vehicle described above, in which the measuring arrangement includes an angular velocity encoder electrically connected to a frequency converter, the angular velocity encoder providing a signal to the frequency converter in accordance with the angular velocity of the at least one vehicle element, the frequency converter generating an analog output in accordance with a characteristic of the signal.

It is still another object of the present invention to provide the vehicle described above, in which the signal includes a pulse train.

It is yet another object of the present invention to provide the vehicle described above, in which the characteristic includes at least one of a pulse width and a period of the pulse train.

It is still another object of the present invention to provide the vehicle described above, in which the measuring arrangement includes a piezoelectric gyroscope rate sensor configured to produce an analog output in accordance with the angular velocity of the at least one vehicle element.

It is yet another object of the present invention to provide the vehicle described above, further including at least one vehicle system, in which the measuring arrangement is configured to communicate angular velocity information to the at least one vehicle system in accordance with the angular velocity of the at least one vehicle element.

It is still another object of the present invention to provide the vehicle described above, in which the at least one vehicle system includes a storage unit configured to store at least a portion of the angular velocity information.

It is yet another object of the present invention to provide the vehicle described above, in which the storage unit includes at least one of a RAM, a hard disk, a flash memory, an EPROM, an EEPROM, and a mini-disk.

It is still another object of the present invention to provide the vehicle described above, in which the at least one vehicle system further includes a peak detecting arrangement configured to detect a peak angular velocity of the angular velocity information.

It is yet another object of the present invention to provide the vehicle described above, in which the peak detecting arrangement is configured to communicate the peak angular velocity to the storage unit, the storage unit being configured to store the peak angular velocity.

It is still another object of the present invention to provide the vehicle described above, in which the at least one vehicle system includes a user interface arrangement configured to communicate the portion of the angular velocity information to at least one external device.

DETAILED DESCRIPTION

Figure 1:
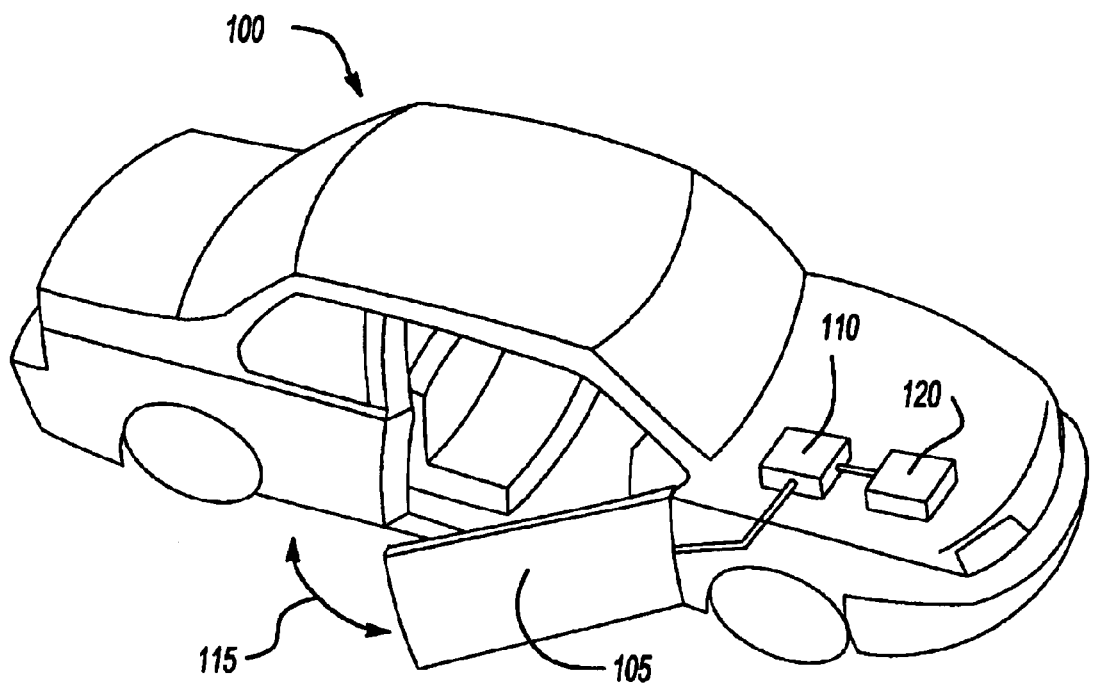
FIG. 1 illustrates an exemplary vehicle according to the present invention, including a measuring arrangement for measuring the angular velocity of a vehicle door.

Referring now to FIG. 1, there is seen a vehicle 100 including a measuring arrangement 110 configured to measure the angular velocity of an opening and/or closing vehicle door 105 and to provide information in accordance with the measured angular velocity to at least one vehicle system 120 for further processing. As shown in FIG. 1, vehicle door 105 may be pivotally opened and/or closed in the direction of arrow 115 by an occupant wishing to enter/exit vehicle 100.

Figure 2:
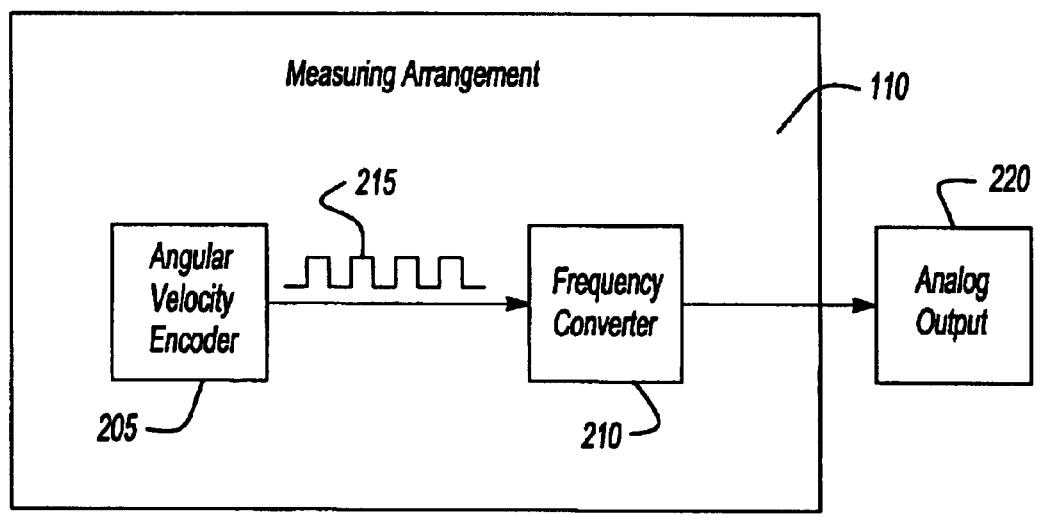
FIG. 2 illustrates an exemplary measuring arrangement according to the present invention.

Referring now to FIG. 2, there is seen a first exemplary measuring arrangement 110 according to the present invention. Measuring arrangement 110 includes an angular velocity encoder 205 communicatively and electrically connected to a frequency converter 210. In operation, the angular velocity encoder 205 provides a signal 215 to the frequency converter 210 in accordance with the angular velocity of at least one vehicle element (not shown), for example, vehicle door 105. The frequency converter 210 then generates an analog output 220 in accordance with at least one characteristic of the signal 215.

Figure 3:
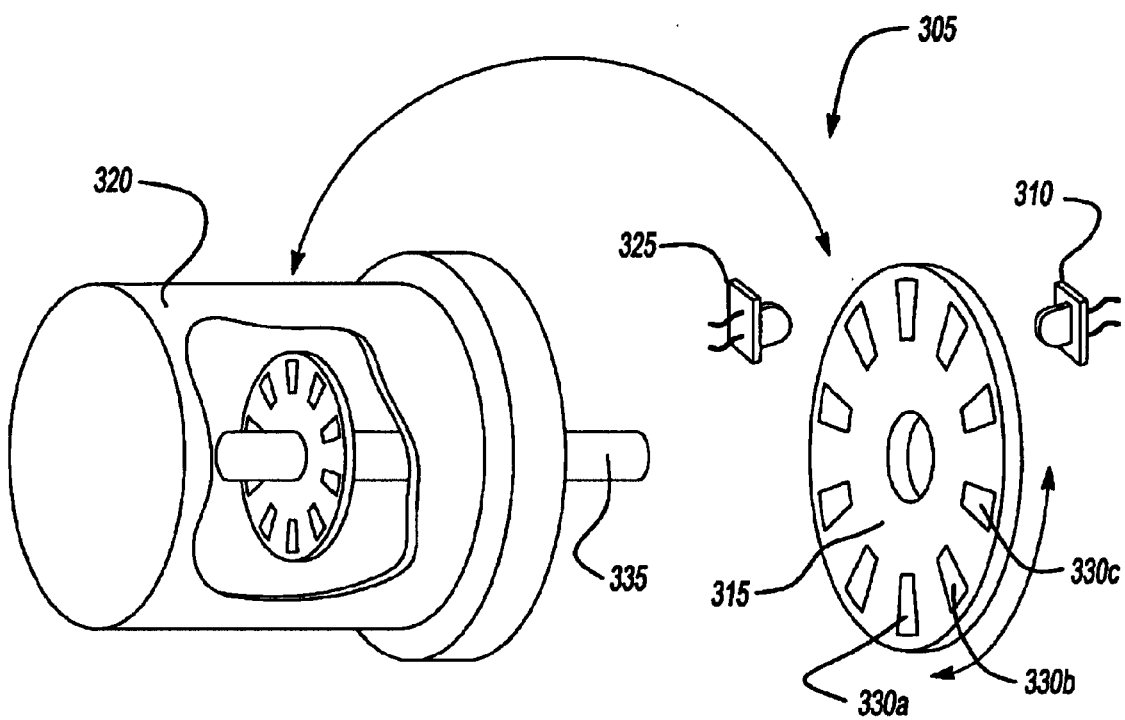
FIG. 3 illustrates an exemplary optical shaft encoder.

Angular velocity encoder 205 may include, for example, any arrangement configured to generate a signal in accordance with the measured angular velocity of the vehicle element. Referring now to FIG. 3, there is seen an exploded view of an exemplary angular velocity encoder 205 including an optical rotary angular velocity encoder 305. Encoder 305 includes a housing 320 containing a shaft 335 connected to a glass disk 315 with equally spaced markings 330a, 330b, 330c, . . . , 330n, a light source 310 mounted on one side of the glass disk 315, and a photo detector 325 mounted on the other side of the glass disk 315. The shaft 335 may be rigidly connected to a hinge point on a pivotally mounted vehicle element, such that the shaft 335 rotates with a pivoting motion of the vehicle element.

In operation, the rotating shaft 335 causes the glass disk 315 to rotate, which causes markings 330a, 330b, 330c, . . . , 330n to intermittently obscure the passage of light between the light source 310 and the photo detector 325. The photo detector 325 converts the intermittent light into associated electrical pulses. Since the markings 330a, 330b, 330c, . . . , 330n are uniformly distributed, encoder 305 generates a pulse in response to a measurable incremental move in position. In this manner, the number of generated pulses per unit time is directly proportional to the angular velocity of the shaft 335 and, as such, the angular velocity of the vehicle element.

The frequency converter 210 is configured to generate an analog output 220 in accordance with a characteristic of the signal 215 communicated by the angular velocity encoder 205. For example, if the angular velocity encoder 205 communicates signal 215 as a pulse train, frequency converter 210 may, for example, generate an analog output 220 in accordance with the period and/or pulse width of the pulse train 215. In this manner, analog output 220 may exhibit an electrical characteristic in accordance with the angular velocity of the vehicle element.

Figure 4:
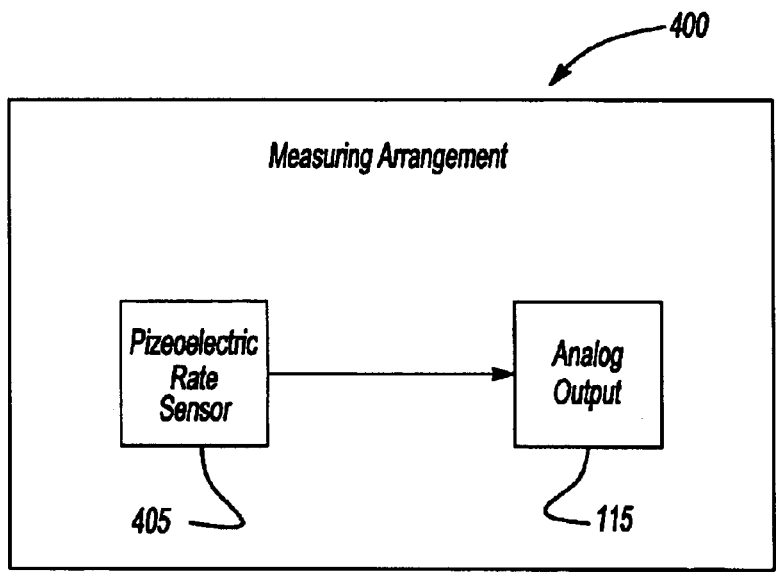
FIG. 4 illustrates another exemplary measuring arrangement according to the present invention.

Referring to FIG. 4, there is seen another exemplary measuring arrangement 400 according to the present invention. In this embodiment, a piezoelectric gyroscope rate sensor 405 replaces the angular velocity encoder 205 and the frequency converter 210 of the exemplary embodiment discussed above with respect to FIG. 2. A piezoelectric angular velocity sensor, such as the piezoelectric rate gyroscope CRS-O3 produced by Silicon Sensing Systems, Japan, operates to convert forces produced by rotational motion directly into a signal representing angular velocity and/or angular rate. Specifically, the rotational motion of, for example, a pivotally connected vehicle element, produces Coriolis forces, which couple vibration to a point 45 degrees relative to the pivoting axis (e.g., a pivoting door hinge of door 105).

It is believed that piezoelectric gyroscope rate sensor 405 is advantageous in that it may be cheaper to produce, may have enhanced accuracy compared to encoder based designs, may be more robust, since the piezoelectric gyroscope rate sensor 405 lacks complex moving parts, and may not require signal conditioning, such as that required with the exemplary embodiment discussed above with respect to the angular velocity encoder 205.

It should be appreciated that, although the exemplary measuring arrangements 110, 400 are described above for measuring the angular velocity of opening and/or closing vehicle door 105, exemplary measuring arrangements 110, 400 may be used to measure the angular velocity of other vehicle elements pivotally mounted to the vehicle 100, such as, for example, minivan lift gates, trunks, hoods, seats, tilt wheels, glove compartments, center bins, etc.

Figure 5:
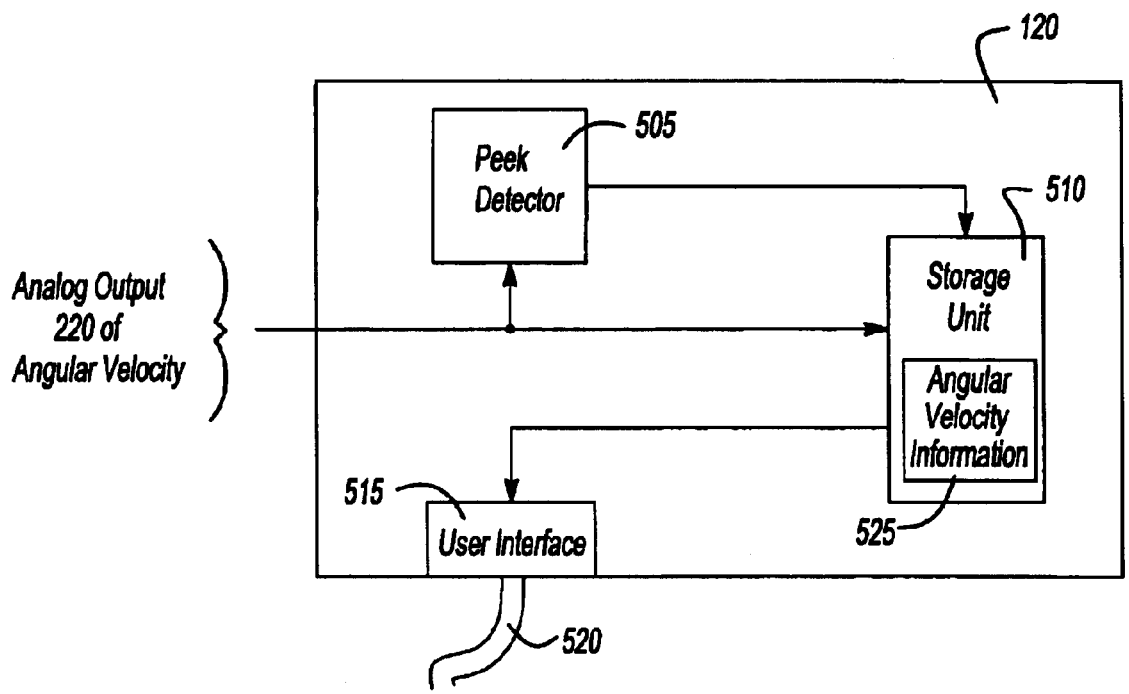
FIG. 5 illustrates a vehicle system according to the present invention configured to receive and process angular velocity information.

Referring now to FIG. 5, there is seen an exemplary vehicle system 120 according to the present invention configured to process the analog output 220 associated with the angular velocity of, for example, the opening and/or closing vehicle door 105. Vehicle system 120 includes peak detector 505 and storage unit 510, each of which is electrically and communicatively coupled to analog output 220. User interface 515 is provided to permit access of angular velocity information 525 stored in the storage unit 510.

The storage unit 525 is configured to store discrete and/or continuous angular velocity information 525 obtained from the analog output 220. Storage unit 525 may include, for example, any arrangement operable to store the angular velocity information 525, such as a hard disk, an EPROM, an EEPROM, a flash memory, a random access memory (RAM), a mini-disk, etc. In this manner, the storage unit may record a "history" of use concerning, for example, the pivotally mounted vehicle door 105. Once stored, the angular velocity information 525 may be retrieved via the user interface 515, for example, by a design engineer, as described in more detail below.

Peak detector 505 is configured to detect a peak angular velocity from the discrete and/or continuous angular velocity information 525 from the analog output 220. For this purpose, peak detector 505 communicates the greatest and/or smallest angular velocity measured to the storage unit 510 for storage and subsequent retrieval. Once communicated, the greatest and/or smallest angular velocity measured may, for example, overwrite a previously stored greatest and/or smallest angular velocity measurement. In this manner, the storage unit 510 may store, not only the history of the angular velocity information 525, but also the peak angular velocity (great and/or small), which may be useful in better designing, for example, the vehicle door 105.

The user interface 515 is configured to permit a user (not shown), for example, a design engineer, to retrieve the angular velocity information 525 from the storage unit 510, for example, via communications cable 520 connected to an external computer (not shown). As described above, the design engineer may use the angular velocity information, for example, to better design the vehicle door 105.

What is claimed is:

1. A vehicle comprising:
   a vehicle body;
   at least one vehicle element pivotally mounted to the vehicle body, the vehicle element configured to pivot through an angle not more than 360 degrees, wherein the at least one vehicle element includes at least one of a vehicle door, a lift-gate, a trunk, a hood, a seat-back, a tilt wheel, and a glove compartment; and
   a measuring arrangement configured to measure angular velocity of the vehicle element, the measurement arrangement including a piezoelectric gyroscope rate sensor positioned on the vehicle element and configured to produce an analog output in accordance with the angular velocity of the at least one vehicle element.

2. The vehicle according to claim 1, wherein the measuring arrangement is configured to measure the angular velocity during at least one of an opening and a closing of the at least one vehicle element.

3. The vehicle according to claim 1, further comprising:
   at least one vehicle system; wherein the measuring arrangement is configured to communicate angular velocity information to the at least one vehicle system in accordance with the angular velocity of the at least one vehicle element.

4. The vehicle according to claim 3, wherein the at least one vehicle system includes a storage unit configured to store at least a portion of the angular velocity information.

5. The vehicle according to claim 4, wherein the storage unit includes at least one of a RAM, a hard disk, a flash memory, an EPROM, an EEPROM, and a mini-disk.

6. The vehicle according to claim 4, wherein the at least one vehicle system further includes a peak detecting arrangement configured to detect a peak angular velocity of the angular velocity information.

7. The vehicle according to claim 6, wherein the peak detecting arrangement is configured to communicate the peak angular velocity to the storage unit, the storage unit being configured to store the peak angular velocity.

8. The vehicle according to claim 4, wherein the at least one vehicle system includes a user interface arrangement configured to communicate the portion of the angular velocity information to at least one external device.

* * * * *